United States Patent Office 3,551,285
Patented Dec. 29, 1970

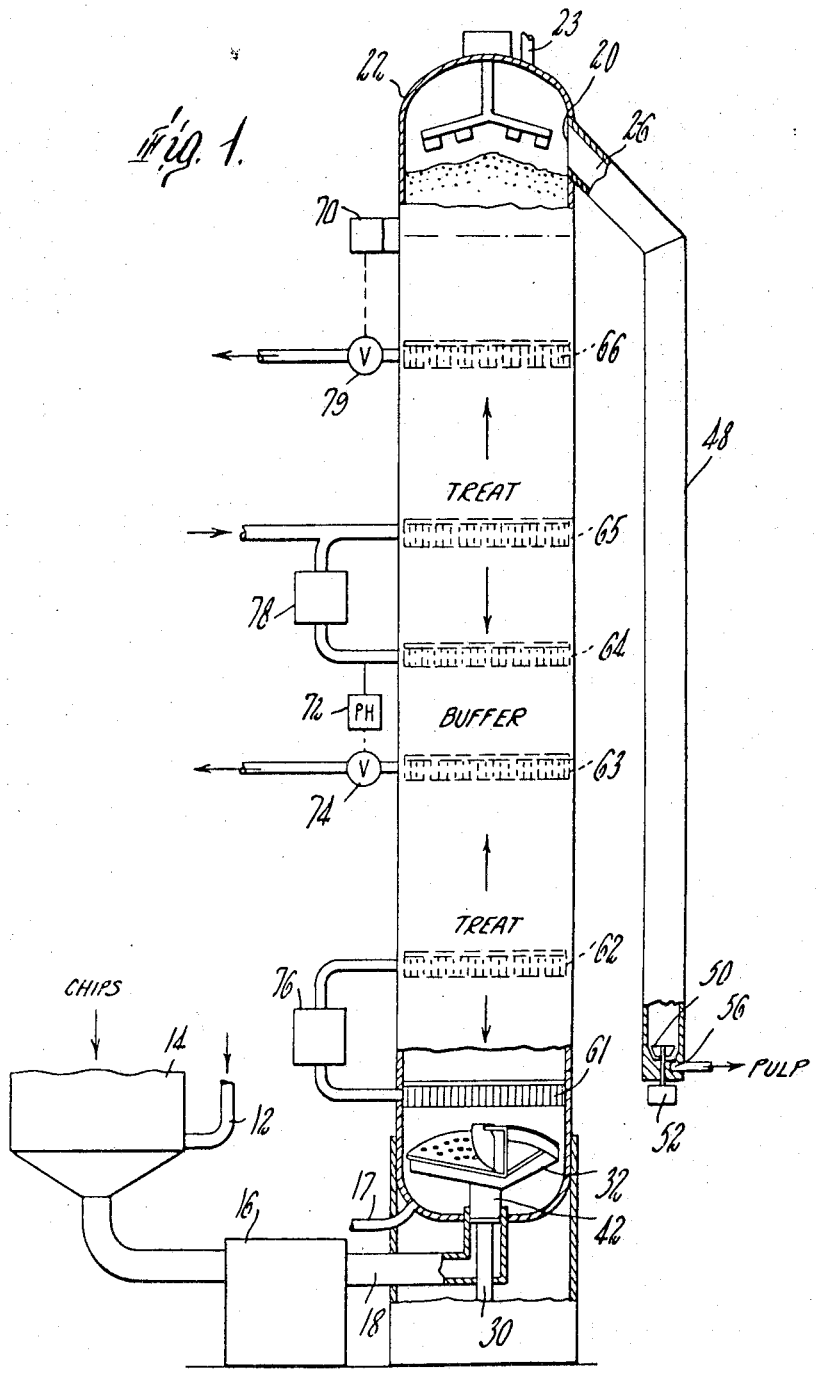

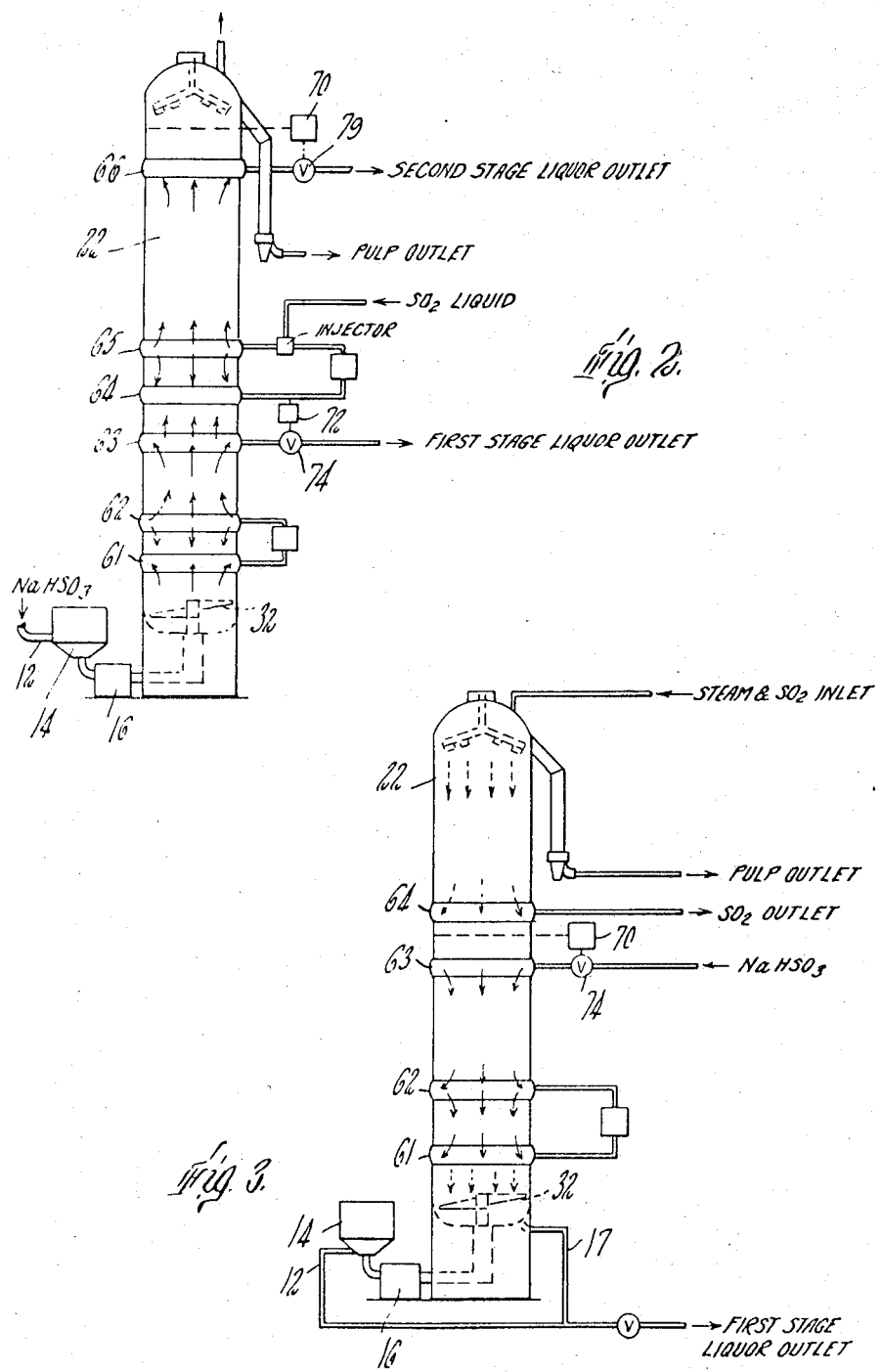

3,551,285
CONTINUOUS PULPING MULTIZONE METHODS
Lloyd N. Lang, deceased, late of Chicago, Ill., by James Lang, administrator, 1300 S. Michigan Ave., Chicago, Ill. 60605
Continuation of application Ser. No. 424,871, Dec. 9, 1964. This application Jan. 13, 1967, Ser. No. 608,722
Int. Cl. D21c *3/26*
U.S. Cl. 162—18         2 Claims

ABSTRACT OF THE DISCLOSURE

Continuous pulping of wood chips or the like by multizone reaction methods within a single upright reaction vessel by the continuous three-stage treatment of the wood chip component of a wood chip-liquid mixture successively to treat said wood chip component with dissimilar chemical reagents in adjacent first and second treatment zones with further treatment in a third treatment zone within the digester vessel by continuously maintaining a generally upright elongated compacted mass of said wood chips within the vessel by progressively feeding said wood chips to the input end of said mass, progressively advancing said wood chips throughout the length of said mass and continuously discharging the treated wood chips from the output end of said mass, meanwhile simultaneously treaing the same in a plurality of successive zones.

---

Figure 4:
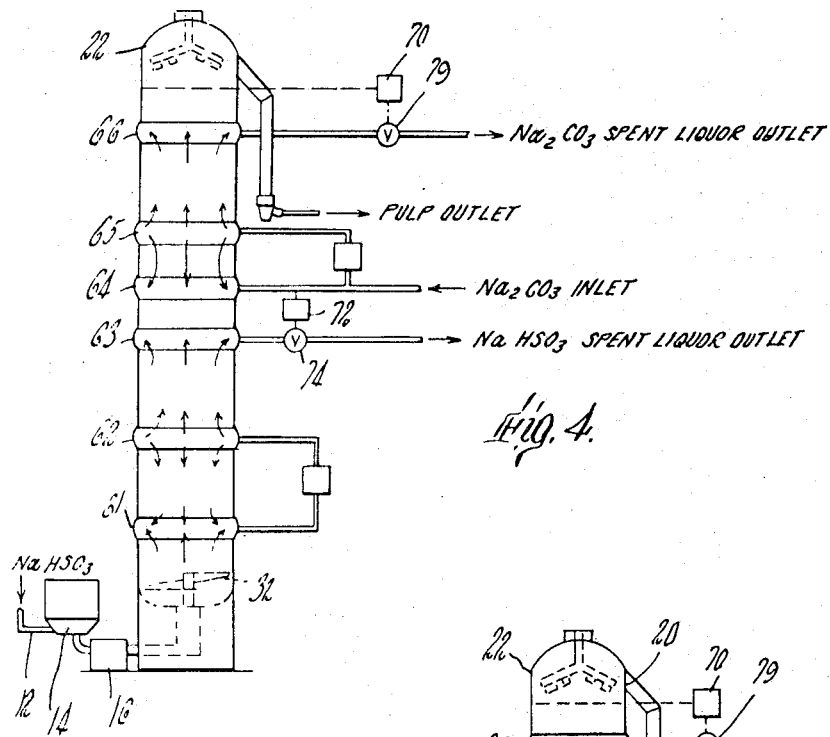

This application is a continuation of Ser. No. 424,871 filed Dec. 9, 1964 (now abandoned) which is a division of Ser. No. 154,931 filed Nov. 20, 1961 and now Pat. No. 3,243,341.

This invention relates to the continuous pulping of fibrous materials, such as wood chips, for example, and more particularly to novel methods for providing a variety of sequential treatments for such materials while they are moved continuously through a single upflow reaction vessel, usually pressurized.

The pulping of wood chips or other fibrous material and the like has long been carried out by a succession of treatments which may be summarized as impregnation and possibly preheating of the chips with a liquid to provide a suitable solid particle-liquid mixture and subsequently chemically treating the chips, usually under pressure and for a substantial period of time. Frequently, more than one chemical treatment may be carried out, in such a way that the deleterious effects of the first used chemical reagent on any succeeding chemical reaction will be avoided.

Heretofore, continuous pulping procedures, whereby a series of treatments are carried out on wood chips, have not been considered to be practical in the large reaction vessels which must be used for the manufacture of wood pulp at high production and low cost. A number of reasons enter into such consideration. For example, with reaction vessels of the order of 10 feet in diameter and 100 feet long, uniformity of retention time and treatment are extraordinarily difficult to achieve, and this is even more of a problem with multiple treatments wherein a variety of fluids such as different chemical reagents must be passed through the chips to affect different treatments, and must then be removed and other fluids substituted.

It is a major object of the invention to provide novel multizone continuous pulping methods useful with a variety of combinations of at least two different chemical reagents.

Other objects of the invention are the provision of novel specific combinations of chemical reactions useful in such methods.

According to the present invention, nevertheless, novel methods are provided whereby a complete multiple stage pulping treatment may be carried out in a single vessel including a plurality of treatments by different chemical reagents.

In more detail, this has been accomplished by the novel methods of the invention by continuously maintaining within such vessel a generally upright, elongated compacted uniform mass of wood chips of substantially uniform cross-sectional area throughout the length of said mass, of progressively feeding said wood chips to the lower end of said mass, and compacting them there at, and progressively advancing the wood chips upwardly throughout the length of said mass by successively contacting and pressing against wood chips only at the lower end of said mass. During their advance, the wood chips are simultaneously treated by a fluid, such as a chemical reagent, moving through the mass of compacted wood chips within the mass, and this is simultaneously carried out in a plurality of superposed zones. These zones include a lower zone wherein the wood chips therein are treated with a first chemical reagent and a superposed upper zone wherein the upwardly moving chips are treated with a second, dissimilar, chemical reagent, the treated wood chips thereafter being discharged from the upper end of the chip mass. It is important in certain of the methods of the invention that the major portion of the first chemical reagent be removed at the upper end of the lower zone, the major portion of the second chemical reagent being added at the lower end of the upper zone. To make such addition of the second chemical reagent practical, the rate of addition, or, preferably, removal of the first chemical reagent may be controlled by a measurement, such as pH or other quality, of the first chemical reagent, such being carried out at a position upwardly of the lower zone, preferably by utilizing a buffer zone between the treatment zones. For most efficient operation, the treating fluids may be moved in a direction countercurrent to the advance of the wood chips within at least a portion of said zones.

The invention also provides novel specific combinations of chemical reactions utilizing at least two dissimilar chemical reagents. These include novel continuous processes for the treatment of wood chips:

(1) first with an alkaline metal bisulfite and then with $SO_2$;
(2) first with $NaHSO_3$ and then with $Na_2CO_3$; and
(3) first with acid and then with a mixture of NaOH, $Na_2S$ and $Na_2CO_3$.

The above described methods may be carried out by apparatus according to the invention, such apparatus comprising the novel combination with an upflow vessel, having a plurality of access openings spaced therealong for introducing and receiving a plurality of treating fluids, such as chemical reagents, as well as means for controlling the fluid flows and levels within the vessel, of mechanical means for advancing the solid particle component, the wood chips, upwardly through the vessel in the form of a uniform mass and independently of the flows of fluids therein. This is done by maintaining a compacted mass of said solid particles of uniform cross-section, at least not decreasing in cross-sectional area in its upward direction, extending throughout the effective length of the vessel and by feeding the solid particles to the lower end of said mass, lifting force being exerted directly only on solid particles located at the lower end of the vessel. This advances the solid particles progressively throughout the length of said mass for treatment and discharge.

The upflow aspect of the invention has been found to be particularly important because of its effect on the heat stability of the systems, as will be hereinafter more fully explained, and the ability of the apparatus of the invention to advance a columnar mass of chips upwardly through the vessel by exerting force only at the bottom of the column is vital to the operation of the invention. In no other way can the advance of chips in large diameter towers be closely controlled with relatively simple mechanisms, while leaving the effective length of the vessel entirely unobstructed for chip advance and for uniform circulation by treating fluids as is required.

For the purpose of fully explaining preferred embodiments of the invention, reference is now made to the following specification, taken together with the accompanying drawings, wherein:

FIG. 1 is a side elevation of preferred apparatus according to the invention; and FIGS. 2 through 5 are schematic views directed to specific embodiments of the apparatus of FIG. 1 for use with specific preferred processes according to the methods of the invention.

Referring to FIG. 1, the preferred apparatus therein shown is generally similar to that shown in U.S. Pat. No. 2,878,116, issued Mar. 17, 1959, but further includes according to the present invention a plurality of fluid access openings spaced therealong, in the form of strainers, preferably, as well as means for controlling fluid flows and levels within the tower. In general, the apparatus includes a generally cylindrical upright elongated pressure vessel 22 of generally uniform cross-sectional area at least not decreasing in its upward direction having a top fluid inlet opening 23 and a bottom opening 18 connected to pump 16 which in turn is connected to a wood chip-liquid mixing vessel 14 having a liquid inlet 12. A lower vessel inlet 17 is also provided. The apparatus is also provided with a top discharge mechanism at its discharge opening 20 connected to a suitable pulp storage tank (not shown). It is important that vessel 22, although of generally uniform cross-sectional area, have a slight taper to provide a gradually increasing cross-sectional area, a taper of about 3/8 inch of diameter per foot of length, for example, being suitable. The advancing means, as shown and described in detail in said patent, includes a foraminous screw means mounted for rotational and reciprocatory movement through a limited distance relatively to the length of the vessel within the reaction vessel 22 near the lower end thereof by means of a shaft 30 extending vertically through the bottom of said vessel generally axially thereof. More specifically, said foraminous screw means comprises a single turn helical plate 32 having therein a plurality of perforations sufficient in number to allow substantially free passage of the liquid therethrough but of small enough size to prevent passage of the chips of other fibrous material. The step of such helical surface is closed by a flat plate extending vertically between its upper and lower edges, and the peripheral edge thereof is positioned closely adjacent the inner walls of the reaction vessel 22 so that passage of chips into the bottom portion of said reaction vessel 22 may be prevented.

For feeding the pressurized mixtures of chips and liquid to the upper surface of said plate, a tubular member 42 having its inner wall concentric with and spaced from shaft 30 is mounted on the lower surface of said helical plate 32 extending downwardly therefrom, thus providing a central aperture between the upper and lower radial edges of said helical plate.

The lower end of shaft 30 extends into a hydraulic cylinder (not shown) mounted beneath the lower end of reaction vessel 22 and forms the piston thereof, said cylinder being connected to a suitable source of fluid pressure to raise said shaft with the helical plate 32 to reciprocate said plate, the force of the vessel pressure against the area of the upper end of said shaft being great enough rapidly to lower the plate when the pressure in the cylinder is exhausted, the pressure vessel 22 in such circumstances acting as an accumulator to provide the necessary force at a rapid rate. Furthermore, the volume of liquid displaced by shaft 30 varies as the shaft reciprocates, causing the entire volume of liquid in vessel 22 to reciprocate over a limited distance. Suitable means (also not shown) for alternatively connecting to pressure and to exhaust may be provided to reciprocate helical plate 32 at any desired rate.

The top discharge mechanism comprises a discharger 26 located near the top of the vessel adapted to remove digested pulp therefrom, and to discharge the pulp to a vertical chamber 48. In the bottom zone of this chamber generally defined as the volume below the illustrated flanged coupling, as is more fully described in co-pending application Ser. No. 805,503 now Pat. No. 3,206,356, an upward facing, bladed agitator 50 is rotatably mounted and operatively connected with a driving means 52, preferably an electric motor. A chamber bottom surface generally conforms with the path of the lower edge of the rotatable blades, to define the lower extremity of the bottom zone. At least one orifice 56 is positioned in the bottom zone of the chamber in the bottom surface below the path of the bladed agitator 50 so that rotation of the bladed agitator causes each blade to wipe by the inlet to the orifice, preventing clogging. The orifice 56 is connected through appropriate piping to the atmosphere. A gate valve assembly may be positioned in the orifice 56 for adjusting and closing its aperture, if desired.

In addition to the bottom openings 17 and 18, in accordance with the present invention, a plurality of strainers are provided spaced from one another along the length of the vessel together with liquid level and flow control means. As shown in FIG. 1, six such strainers 61–66, respectively lowermost to uppermost, are employed as a typical example to provide a highly flexible system for a process utilizing two separate stages with different chemical reagents for treatment of wood chips therein. These strainers, which may be of the type shown and described in Ser. No. 702,194 now Pat. No. 2,998,064, may be spaced generally uniformly along the length of the vessel to define two treatment zones with an intermediate buffer zone, a first treatment zone being between chip lifter plate 32 and strainer 63 and a second treatment zone being between strainer 64 and uppermost strainer 66, with an intermediate buffer zone between strainer 63 and the next upper succeeding strainer 64.

A level sensing device 70, may be suitably located to sense a liquid level above top strainer 66 and below the discharge opening 20, to define at said liquid level the lower end of a drainage zone for draining liquid from the wood chip mass before their discharge in a third treatment zone above the uppermost end of the second treatment zone at the strainer below said third zone and, as disclosed in Swedish Pat. No. 122,608 of Aug. 31, 1948, in U.S. Pat. No. 3,061,007 issued Oct. 30, 1962, and in Pulp and Paper, "New Continuous Digester" of September 1959, the lowermost end of a third treatment zone as for washing by countercurrent liquid flow through inlet 23, if such be desired, followed by drainage in the drainage zone in the upper end of the third treatment zone before their discharge and to control the outlet of fluid by operating valve 79 of upper strainer 66. Further means are provided for controlling fluid levels and flows, as well as for heating as desired, all according to the invention, including the effective level of the interface between the upper and lower chemical treatment zones. This latter aspect of the apparatus of the invention is vital to the useful functioning thereof when incompatible successive reagents are to be employed, as is frequency the situation, and is solved in a unique manner in the apparatus of the invention by providing not only an intermediate buffer zone, but also by continuously controlling the rate of removal of the first treating chemical reagent from the lower treatment zone by means of a measurement thereof. Such measurement may readily be made at strainer 64, which is an outlet defining the lower end of the upper treatment zone. Such measurement may be of any of a number of qualities of the reagent in the lower zone, but characteristically may be of pH by a suitable pH measuring and controlling device 72 operating a valve 74 in the fluid output line from strainer 63.

The fluid flows within the apparatus may be controlled for example by creating a lower countercurrent flow region within each of the treatment zones by means of the intermediate strainer 62, 65 and lower strainers 61, 64, respectively, of each treatment zone by means of suitable devices 76, 78, respectively, including pump means. Heaters may also be included in devices 76, 78 to heat the lower and upper treatment zones, respectively, if desired. The inlet for the first chemical reagent to the lower zone may be through inlet 12 of wood chip-liquid vessel 14, while its outlet may be at strainer 63, controlled by valve 74, as described above. The inlet of the second chemical reagent may be at strainer 65, while its outlet may be at strainer 66, controlled by valve 79 and its controlling device 70. Other inlets and outlets may be utilized as required for any desired flow pattern.

This specific structure provides great flexibility of operation by permitting the use of a variety of treatment sequences with either co-current or counter-current liquid flow relatively to particle advance. Of course, it is not essential that strainers be employed for introducing liquid into the vessel, but the employment of strainers rather than simpler access openings permits flow reversal without alteration of the reaction vessel which is impractical.

The operation of the above described apparatus has been generally described above. However, to summarize the specific flow pattern shown, the wood chips and the first chemical reagent are mixed in vessel 14 and then passed into reaction vessel 22, where the chip elements thereof are passed slowly upward throughout the chip mass therein by the operation of plate 32. The fluid flow in the lower region of the lowermost treatment zone between strainers 61 and 62 is countercurrent to the direction of wood chip movement, as shown by the arrow in FIG. 1, by the operation of the pump means of device 76, and is co-current in the upper region between strainers 62, 63 by virtue of the output from valve 74. Much the same flow pattern prevails in the upper treatment zone, with countercurrent flow occurring between strainers 64 and 65, to move the chemical reagent introduced at strainer 65 downwardly through the lower region of the upper treatment zone, and co-current flow prevailing in the upper region thereof by virtue of the output from valve 79 which is operated by level control device 70 to establish a liquid level below wood chip discharge opening 20 above which wood chip drainage takes place causing countercurrent liquid flow with fluid for washing or other treating entering through top inlet 23 (FIG. 3). The interface is maintained within the buffer zone between strainers 63 and 64 by the operation of sensing device 72 which controls valve 74 through which the first chemical reagent is exhausted, said sensing device being responsive to a quality of the first chemical reagent appearing at the lower end of the upper treatment zone. Preferably, there is no fluid flow throughout the buffer zone. The level control device 70 operates its associated valve 79 in the usual manner to control the rate at which the second reagent together with any added drainage liquid is exhausted.

In FIGS. 2 through 5 are shown as examples, specific multiple treatment methods according to the invention utilizing the apparatus thereof.

In FIG. 2 is shown a continuous process for the treatment of wood chips first with an alkaline metal bisulfite, typically $NaHSO_3$ and then by liquid $SO_2$. Thus a 5 to 10 percent solution of $NaHSO_3$ at pH of about 4.5 is introduced at mixing vessel input 12 and mixed in vessel 14 before being introduced to the pressurized reaction vessel 22. After introduction, the chip mass is first heated by countercurrent liquid flow in the lower region between strainers 61 and 62 to a temperature of about 325–340 degrees F., and then becomes suitably impregnated and sulfonated as it continues to move upward through the upper region of the lower treatment zone between strainers 62 and 63, wherein co-current liquid flow occurs.

At strainer 63, which defines the upper end of the lower treatment zone, a portion of the $NaHSO_3$ solution is removed for suitable recovery, through controlling valve 74 and the chips within the mass thereof pass upward through the buffer zone between strainers 63 and 64, into the lower region between strainers 64 and 65, of the upper treatment zone. The second chemical, liquid $SO_2$, is introduced through a suitable injector into the remaining $NaHSO_3$ solution externally to the vessel 12 and the resulting solution is introduced at strainer 65 for countercurrent flow, passing outwardly at strainer 64. This serves to impregnate the wood chips with liquid having a higher concentration of $SO_2$. A portion of the $NaHSO_3$ solution moves upwardly through the buffer zone between strainers 63 and 64. Since the pH of the treatment in the upper zone is about 1.5 pH, the pH sensing and controlling device 72 is arranged to be responsive to a pH of about 1.5, to increase the preset opening of valve 74 if the pH sensed increases from that value and to decrease said opening if the pH sensed decreases from that value.

Upwardly of strainer 65, the $SO_2$ reagent passes through the upper region of the upper treatment zone between strainers 65 and 66 for further and final treatment of the wood chips, co-current flow occurring in this region until removal of the $SO_2$ reagent at uppermost strainer 66, the liquid level being controlled thereabove by level sensing device 70 which operates strainer valve 79. Thereafter, the treated chips are discharged.

In FIG. 3 is shown a process somewhat modified from that of FIG. 2 in that gaseous $SO_2$ is utilized rather than a solution thereof, with the direction of fluid flows also being altered. More specifically, the strainers associated with the lower treatment zone are utilized as before, except that fresh $NaHSO_3$ reagent is introduced at the upper strainer 63 of the lower treatment zone for countercurrent flow throughout the entire length of the lower treatment zone with removal at opening 17 below plate 32, although it could also be removed at lower strainer 61. The liquid introduced at chip mixing vessel input 12 can be taken from opening 17 as well.

The buffer zone between strainers 63 and 64 is utilized for control of the level of the $NaHSO_3$ reagent, level device 70 thus being used to operate its valve 74, so that the region thereabove, including the entire upper treatment zone, is subjected to the action of the gaseous $SO_2$ introduced at opening 23. The uppermost strainers 65 and 66 are not needed in this process, the gaseous $SO_2$ after countercurrent flow throughout the upper treatment zone being removed through the strainer 64 at the lower end thereof.

In FIG. 4 is shown a continuous process for the treatment of wood chips first with $NaHSO_3$ and then with $Na_2CO_3$. The direction of fluid flows is generally the same as discussed with reference to FIG. 2, with the $NaHSO_3$ reagent being introduced at chip vessel inlet 12 for co-current flow through the lower treatment zone except in the region between strainers 61 and 62 where the flow is desirably countercurrent, the heating being to about 300–325 degrees F. for the treatment in the remainder of the lower treatment zone between strainers 62 and 63 at a pH of about 4.5–5.0. The treatment in the upper zone is by means of $Na_2CO_3$ solution at a temperature of about 330 degrees F. and pH of 8.5, with the reagent thereafter being removed at upper strainer 66 under the control of level control device 70. Within the upper treatment zone, countercurrent flow occurs within the lower region thereof by heater and pump device 78, while co-current flow occurs in the upper region thereof. The liquid interface is maintained in the buffer zone between strainers 63 and 64, without any liquid flow therethrough, by sensing the pH at the upper strainer 64 thereof, such being maintained at about 8.5 by the operation of valve 74 to ensure that substantially all of the free NaHSO₃ reagent is removed from the chips before the Na₂CO₃ reagent is introduced to them.

Figure 5:
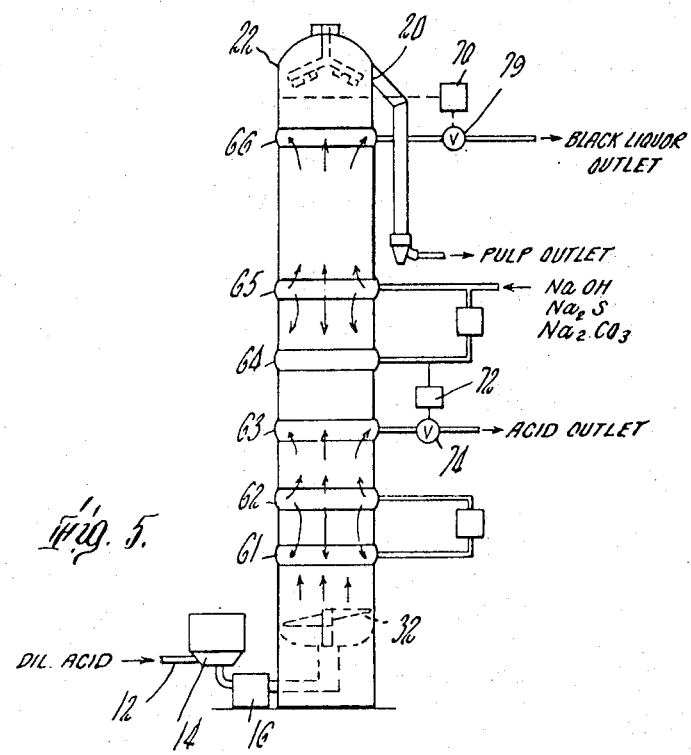

In FIG. 5 is shown a continuous process for the treatment of wood chips according to the prehydrolysis kraft process, wherein the cooking liquor is a mixture of "black liquor" and "white liquor" the latter being principally a mixture of NaOH, Na₂S and Na₂CO₃, and the kraft cooking is preceeded by a water hydrolysis and extraction. Thus, water or a dilute solution of sulfuric acid introduced to the chip mixing vessel inlet 12 and passed with the chips to the lower treatment zone, wherein it is heated by countercurrent flow between strainers 61 and 62 and passes upward with co-current flow for hydrolysis extraction of the hemicellulose fraction of the wood chip until it is removed at strainer 63 which defines the upper end of the lower treatment zone. In the upper treatment zone between strainers 64 and 66 the chips are treated with heated "white liquor" introduced at intermediate strainer 65 for countercurrent flow in the lower region thereof between strainer 65 and 64 to heat the wood chips to about 350 degrees F. for their treatment while passing upwardly between strainers 65 and 66. The interface is maintained as before within the buffer zone by control of the pH transition to alkaline, the lower treatment zone having a pH of less than 7, while the upper treatment zone has a highly alkaline pH of above 10–12. The uppermost liquid level is controlled as before, with the treated wood chips being discharged through discharge opening 20.

It will be seen, then, that the invention provides novel multiple zone treatment methods and apparatus. Various modifications of the invention within the spirit thereof and the scope of the appended claims will be apparent to those skilled in the art.

What is claimed is:

1. A method for the continuous treatment of the wood chip component of a wood chip-liquid mixture to treat said wood chip component with at least two dissimilar chemical reagents comprising continuously maintaining a generally upright elongated compacted uniform mass of said wood chips of substantially uniform cross sectional area throughout its length by progressively feeding said wood chips to the lower end of said mass and compacting them thereat progressively advancing said wood chips upwardly throughout the length of said mass by successively contacting and pressing against wood chips only at the lower end of said mass and continuously discharging the treated wood chips from the upper end of said mass meanwhile simultaneously treating the same during said advancing by fluid movement through said compacted wood chips at a rate independent of the rate of advance of said wood chips in a plurality of superposed zones including a lower treatment zone wherein said mass is treated with a first chemical reagent and a superposed upper treatment zone wherein said mass is treated with a second chemical reagent and a buffer zone between said treatment zones wherein said mass is treated with a chemical reagent and further including the step of continuously controlling the rate of removal of one of said chemical reagents by a measurement of said one chemical reagent at the opposite end of said buffer zone from the treatment zone of the chemical reagent being measured.

2. A method for the continuous treatment of the wood chip component of a wood chip-liquid mixture to treat said wood chip component with at least two dissimilar chemical reagents comprising continuously maintaining a generally upright elongated compacted uniform mass of said wood chips of substantially uniform cross sectional area throughout its length by progressively feeding said wood chips to the lower end of said mass and compacting them thereat progressively advancing said wood chips upwardly throughout the length of said mass by successively contacting and pressing against wood chips only at the lower end of said mass and continuously discharging the treated wood chips from the upper end of said mass meanwhile simultaneously treating the same during said advancing by fluid movement through said compacted wood chips at a rate independent of the rate of advance of said wood chips in a plurality of superposed zones including a lower treatment zone wherein said mass is treated with a first chemical reagent and a superposed upper treatment zone wherein said mass is treated with a second chemical reagent and continuously controlling the rate of removal of at least one of said chemical reagents by a pH measurement of said one chemical reagent, said measurement being carried out upwardly of the treatment zone of said one of said chemical reagents.

References Cited

UNITED STATES PATENTS

| 2,359,543 | 10/1944 | Branzell et al. | 162—237 |
| 3,007,839 | 11/1961 | Richter | 162—17 |

FOREIGN PATENTS

| 852,892 | 11/1939 | France | 162—249 |
| 145,257 | 5/1954 | Sweden | 162—249 |

HOWARD R. CAINE, Primary Examiner

U.S. Cl. X.R.

162—19, 37, 42, 237, 249